Sept. 22, 1925.                L. C. BAYLES ET AL                1,554,777
                                    ROCK DRILL
                               Filed May 29, 1923
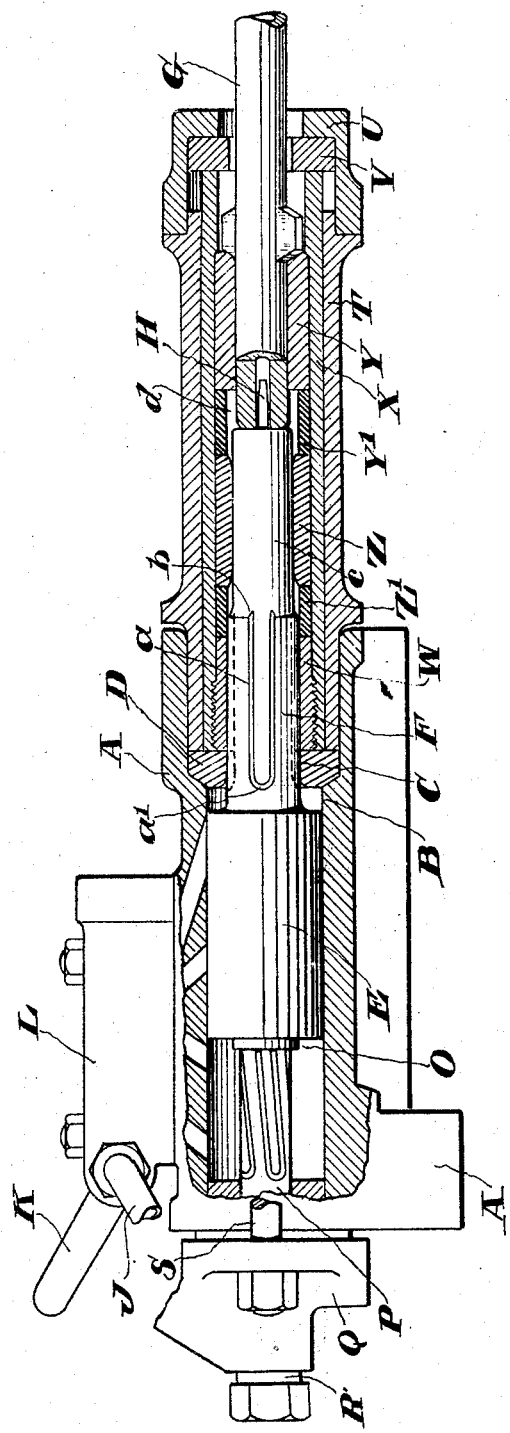
INVENTOR
*Lewis C. Bayles*
AND *Fred M. Slater*
BY
HIS ATTORNEY Patented Sept. 22, 1925.

1,554,777

UNITED STATES PATENT OFFICE.

LEWIS C. BAYLES AND FRED M. SLATER, OF EASTON, PENNSYLVANIA, ASSIGNORS TO INGERSOLL-RAND COMPANY, OF JERSEY CITY, NEW JERSEY, A CORPORATION OF NEW JERSEY.

ROCK DRILL.

Application filed May 29, 1923. Serial No. 642,178.

*To all whom it may concern:*

Be it known that we, LEWIS C. BAYLES and FRED M. SLATER, citizens of the United States, and residents of Easton, county of Northampton, and State of Pennsylvania, have invented a certain Rock Drill, of which the following is a specification, accompanied by drawing.

This invention relates to a fluid actuated rock drill of the hammer type, and its objects are to make a machine in which the motive fluid is prevented from entering the hollow drill steel along with the water used for cleansing the holes in the rock, thus preventing fogging and the creation of fine dust in the atmosphere. A further object is to change the present existing machines of the hammer type, so as to prevent the delivery of motive fluid to the drill steel along with the cleansing water.

To these ends the invention is shown in the accompanying drawing in which the figure is a longitudinal sectional elevation, of so much of a rock drill of the type known as the "Leyner," as will serve to illustrate the invention.

Referring to the drawings, the cylinder A is provided with a main bore B and the forward bore C of smaller diameter, which latter bore may be formed by a cylinder front washer D either separate from or integral with the cylinder. A piston E, adapted to reciprocate in the cylinder is provided with a forward extension F fitting the bore C of smaller diameter. A hollow drill steel G is carried in the usual manner by the forward end of the machine, and extends into the machine to a position to receive the impact blows of the piston. A water tube H extends longitudinally through and approximately fits a hole in the piston and is adapted to deliver water to the drill steel.

Motive fluid is supplied to the machine through the inlet J controlled by a suitable throttle valve, of which the controlling handle K only is indicated. A suitable fluid distributing valve may be provided in the valve chest L, but as the distribution of motive fluid to the cylinder forms no part of the present invention, the details of such construction are not indicated. The piston is provided with a rifle bar nut O cooperating with the rifle bar P and the usual back head is indicated at Q, having the water connection R. The parts of the machine are held together by the usual side bolts S, a portion of one side bolt only being shown.

Any suitable and usual front head construction for the machine may be provided, in this instance, so much of the standard "Leyner" construction being shown as may be used with our improvement. The front head T is provided with the front head cap U, in which is located the chuck key V. The chuck nut W is threaded to the chuck X and within the chuck are located the chuck front bushing Y and the chuck back bushing Z. If desired, a spacer Y' may be inserted between the bushings Y and Z and another spacer Z' may be inserted between the chuck back bushing Z and the chuck nut W.

So far described, the front head cap U, chuck key V, and chuck front bushing Y and chuck nut W are all standard parts, but in accordance with our invention the piston extension F is made somewhat longer and the flutes $a$ are located on the rearward portion only of the extension, or that portion of the piston extension which enters the main bore B. The flutes begin at points $a'$ adjacent the piston head and extend forwardly for a portion of the length of the piston extension, terminating at the points $b$. The remainder of the piston extension having a smooth and preferably unbroken surface $c$ forms a seal with the chuck back bushing Z, so that communication between the main bore B and the chuck cavity $d$ adjacent the rearward end of the drill steel is constantly sealed and motive fluid is prevented from blowing through the flutes $a$ into the front head parts of the machine. Although the flutes $a$ are permitted to freely enter the main bore of the cylinder, air is prevented from passing down through the hollow drill steel from the main bore, owing to the substantial seal provided between the smooth cylindrical surface of the piston extension, and the chuck back bushing Z.

Any motive fluid which may leak past the seal around the smooth portion of the piston extension or pass around the water tube H through the hole in the piston, will escape to atmosphere from the space $d$ surrounding the extreme shank end of the drill steel, because of the loose fit of the drill steel shank in the chuck front bushing Y. This also prevents the accumulation of pressure in the said space or chuck cavity *d*.

Obviously, the chuck parts for our improved dustless piston and front end construction may be constructed in different ways, without departing from the spirit of the invention. The attached drawing shows the invention applied to the present standard "Leyner" machine, the only alterations being the use of a piston having a longer forward extension with the flutes at the rearward portion of the extension instead of on the forward portion as heretofore, and such changes in the chuck parts as may be necessary to accommodate the new type of piston. Obviously also, the chuck back bushing Z and the spacing pieces Z' and Y' need not all be separate pieces. It will also be seen that the forward smooth portion of the piston extension is of smaller diameter than the outside diameter of the fluted portion.

In practice clearance is left between the flutes *a* and the flutes of the nut W for the reason that the machining of the flutes and nut and the alignment of the piston E in the cylinder, the joint between the front head T and cylinder A, need not be absolutely accurate. There is therefore a slight turning of the piston E with respect to the chuck X. A corresponding turn also occurs between the washer or chuck back bushing Z and the nose *c* which is permitted without leakage therebetween since the surfaces of the two latter parts are accurately cylindrical. The washer Z being of metal or an unyielding material does not bind on the piston nose *c* whether the piston E is rotating or reciprocating. The seal effected thereby is for this reason durable and effective.

We claim:

In a fluid actuated rock drill, the combination of a cylinder having a main bore, a forward bore of smaller diameter, a front head, a chuck rotatable in the front head for receiving the drill steel, a nut in the chuck, a piston in the cylinder having a fluted forward extension cooperating with the nut in the chuck, a smooth cylindrical metal washer in the chuck forward of the nut and a smooth cylindrical portion formed integrally with the piston extension forward of the fluted portion free to rotate in the washer with respect to the washer and to reciprocate without binding therewithin to prevent motive fluid from passing from the cylinder beyond said washer.

In testimony whereof we have signed this specification.

LEWIS C. BAYLES.
FRED M. SLATER.